(12) United States Patent
Thuppanna et al.

(10) Patent No.: US 8,782,736 B1
(45) Date of Patent: Jul. 15, 2014

(54) METHOD AND APPARATUS FOR POLICY CRITERIA GENERATION

(71) Applicant: McKesson Financial Holdings, Hamilton (BM)

(72) Inventors: Nataraja Thuppanna, Morrisville, NC (US); Ismael Cruz, Durham, NC (US); Debora Sinclair, Durham, NC (US)

(73) Assignee: McKesson Financial Holdings, Hamilton (BM)

( * ) Notice: Subject to any disclaimer, the term of this patent is extended or adjusted under 35 U.S.C. 154(b) by 0 days.

(21) Appl. No.: 13/755,659

(22) Filed: Jan. 31, 2013

(51) Int. Cl.
*G06F 17/00* (2006.01)

(52) U.S. Cl.
USPC .......................................................... 726/1

(58) Field of Classification Search
USPC .............................................. 726/1; 707/694
See application file for complete search history.

(56) References Cited

U.S. PATENT DOCUMENTS

| | | | |
|---|---|---|---|
| 8,352,424 B2* | 1/2013 | Zunger et al. | 707/610 |
| 2010/0049745 A1* | 2/2010 | Aebig et al. | 707/200 |
| 2010/0050230 A1* | 2/2010 | Aebig et al. | 726/1 |
| 2011/0196830 A1* | 8/2011 | Zunger et al. | 707/624 |
| 2012/0078432 A1* | 3/2012 | Weatherhead et al. | 700/295 |
| 2013/0191420 A1* | 7/2013 | Petri | 707/804 |

* cited by examiner

*Primary Examiner* — Beemnet Dada
(74) *Attorney, Agent, or Firm* — Alston & Bird LLP

(57) ABSTRACT

Methods, apparatuses, and computer program products are described herein that are configured to generate criteria that defines instances in which a policy is to be applied or otherwise activated. In some example embodiments, a method is provided that comprises receiving an indication of a selected field of one or more fields that are applicable to a criteria for a policy. The method of this embodiment may also include receiving an indication of an operation selection and a specified value related to the selected field. The method of this embodiment may also include generating a criterion that modifies the criteria for the policy.

18 Claims, 11 Drawing Sheets

METHOD AND APPARATUS FOR POLICY CRITERIA GENERATION

TECHNOLOGICAL FIELD

Embodiments of the present invention relate generally to a method, apparatus, and computer program product for generating criteria for policy activation and/or application.

BACKGROUND

In some instances, software programs are generated such that they provide a polished front end for users. Such a front end enables a user to easily navigate through the functionality of the program. However, the backend of those same software programs are generally very complex and do not lend themselves to easy modification and/or updating. For example, a novice user may be able to navigate the front end whereas a programmer or other experienced software professional may be required to provide the necessary updates or modifications to the software program. While the software programmer or other software professional may be qualified to make the updates or modifications, the time or resources expended may not be as efficient as if users themselves could update or modify the software program should a change need to be made. As such, in some cases the updates or modifications are not simply made or may be delayed.

BRIEF SUMMARY

Methods, apparatuses, and computer program products are described herein that, are configured to provide an intuitive user interface that allows a novice user to update or modify a software program. In particular, the embodiments of the present invention enable a user to generate criteria that are configured to define instances in which a policy associated with the software program is to be applied or otherwise activated. In some example embodiments, a method is provided that comprises receiving an indication of a selected policy of one or more policies defined by a software program. The method of this embodiment may also include generating, using a processor and in response to receiving the indication of a selected policy, a plurality of fields that are applicable to a criteria for the selected policy. In some example embodiments, the criteria comprises one or more criterion that define instances in which the policy is to be activated by the software program. The method of this embodiment may also include enabling a user to build a criterion that modifies the criteria for the selected policy. In some example embodiments, the criterion is generated based on an indication of at least one selected field of the plurality of fields and an indication of an operation selection and a specified value associated with each selected field. In some example embodiments, the software program is configured to use the modified criteria to determine an instance in which the selected policy is to be applied.

In further example embodiments, an apparatus is provided that includes at least one processor and at least one memory including computer program code with the at least one memory and the computer program code being configured, with the at least one processor, to cause the apparatus to at least receive an indication of a selected policy of one or more policies defined by a software program. The at least one memory and computer program code may also be configured to, with the at least one processor, cause the apparatus to generate a plurality of fields that are applicable to a criteria for a selected policy in response to receiving the indication of the selected policy. In some example embodiments, the criteria comprises one or more criterion that define instances in which the selected policy is to be activated by the software program. The at least one memory and computer program code may also be configured to, with the at least one processor, cause the apparatus to enable a user to build a criterion that modifies the criteria for the selected policy. In some example embodiments, the criterion is generated based on an indication of at least one selected field of the plurality of fields and an indication of an operation selection and a specified value associated with each selected field. In some example embodiments, the software program is configured to use the criteria to determine an instance in which the selected policy is to be applied.

In yet further example embodiments, a computer program product may be provided that includes at least one non-transitory computer-readable storage medium having computer-readable program instructions stored therein with the computer-readable program instructions including program instructions configured to receive an indication of a selected policy of one or more policies defined by a software program. The computer-readable program instructions may also include program instructions configured to generate a plurality of fields that are applicable to a criteria for a selected policy in response to receiving the indication of the selected policy. In some example embodiments, the criteria comprises one or more criterion that define instances in which the selected policy is to be activated by the software program. The computer-readable program instructions may also include program instructions configured to enable a user to build a criterion that modifies the criteria for the selected policy. In some example embodiments, the criterion is generated based on an indication of at least one selected field of the plurality of fields and an indication of an operation selection and a specified value associated with each selected field. In some example embodiments, the software program is configured to use the criteria to determine an instance in which the selected policy is to be applied.

In yet further example embodiments, an apparatus is provided that includes means for receiving an indication of a selected policy of one or more policies defined by a software program. The apparatus of this embodiment may also include means for generating, in response to receiving the indication of a selected policy, a plurality of fields that are applicable to a criteria for the selected policy. In some example embodiments, the criteria comprises one or more criterion that define instances in which the selected policy is to be activated by the software program. The apparatus of this embodiment may also include means for enabling a user to build a criterion that modifies the criteria for the selected policy. In some example embodiments, the criterion is generated based on an indication of at least one selected field of the plurality of fields and an indication of an operation selection and a specified value associated with each selected field. In some example embodiments, the software program is configured to use the criteria to determine an instance in which the selected policy is to be applied.

BRIEF DESCRIPTION OF THE DRAWINGS

Figure 1:
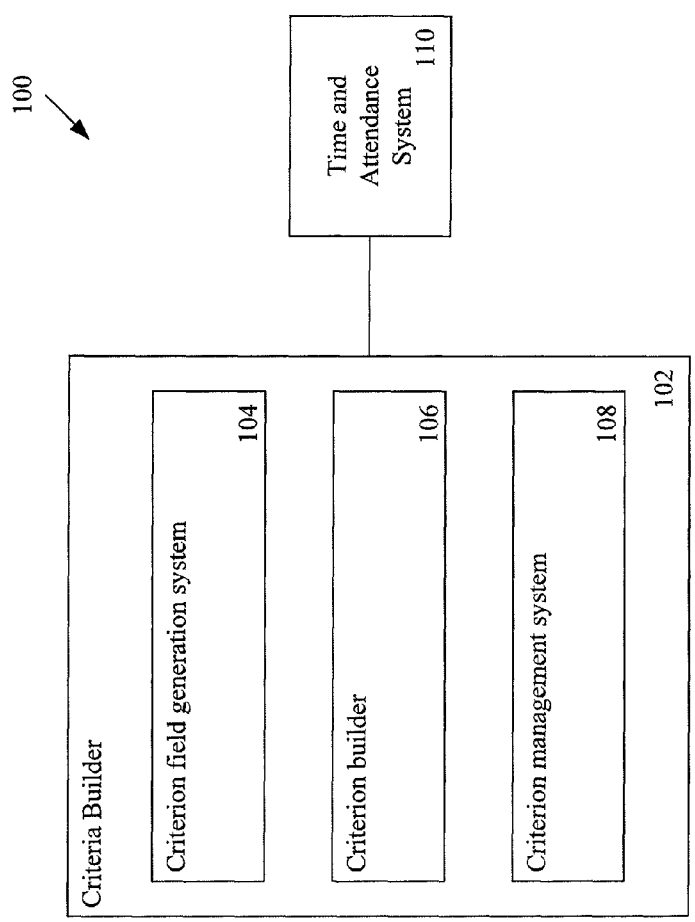
Figure 2A:
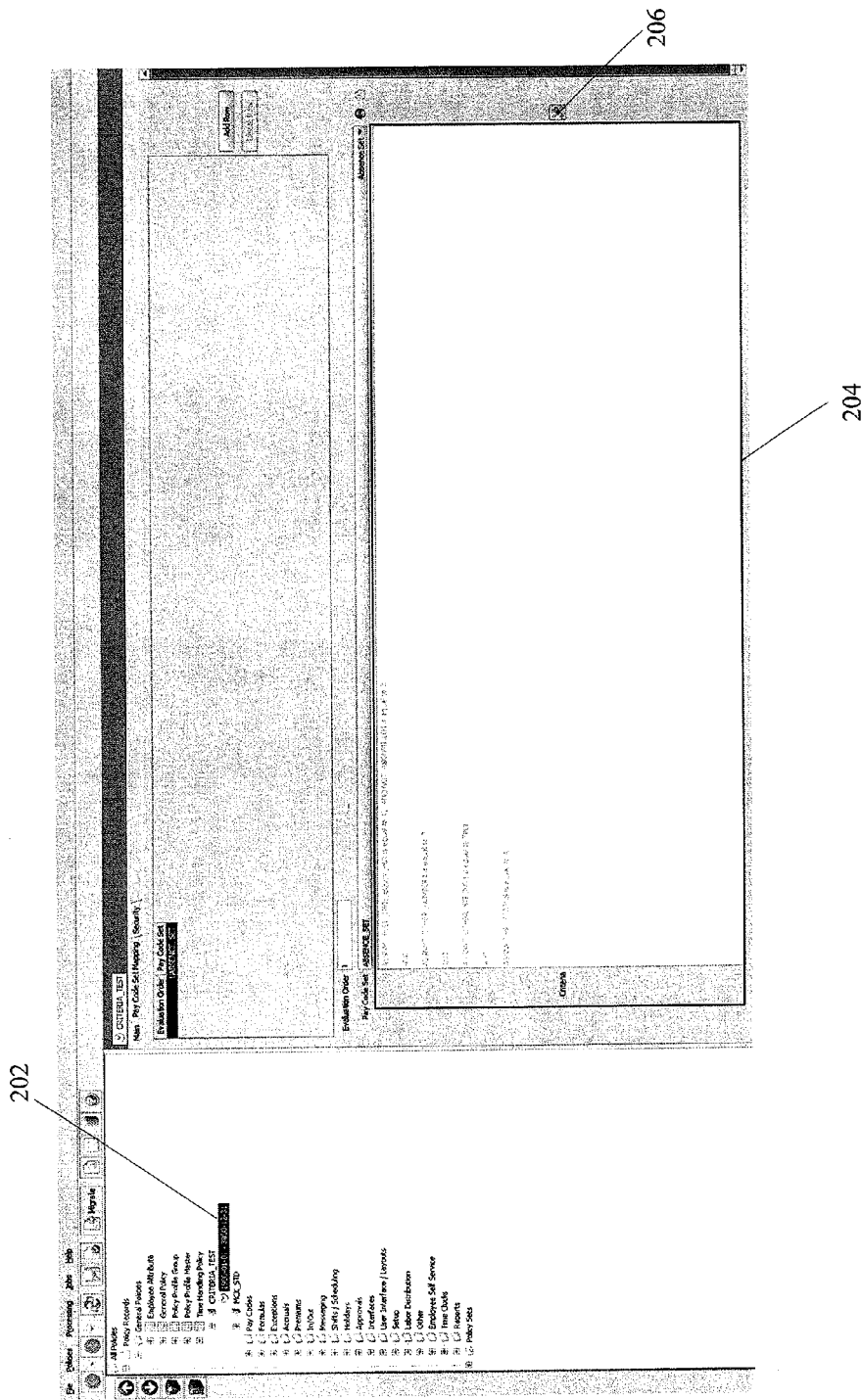
Figure 2B:
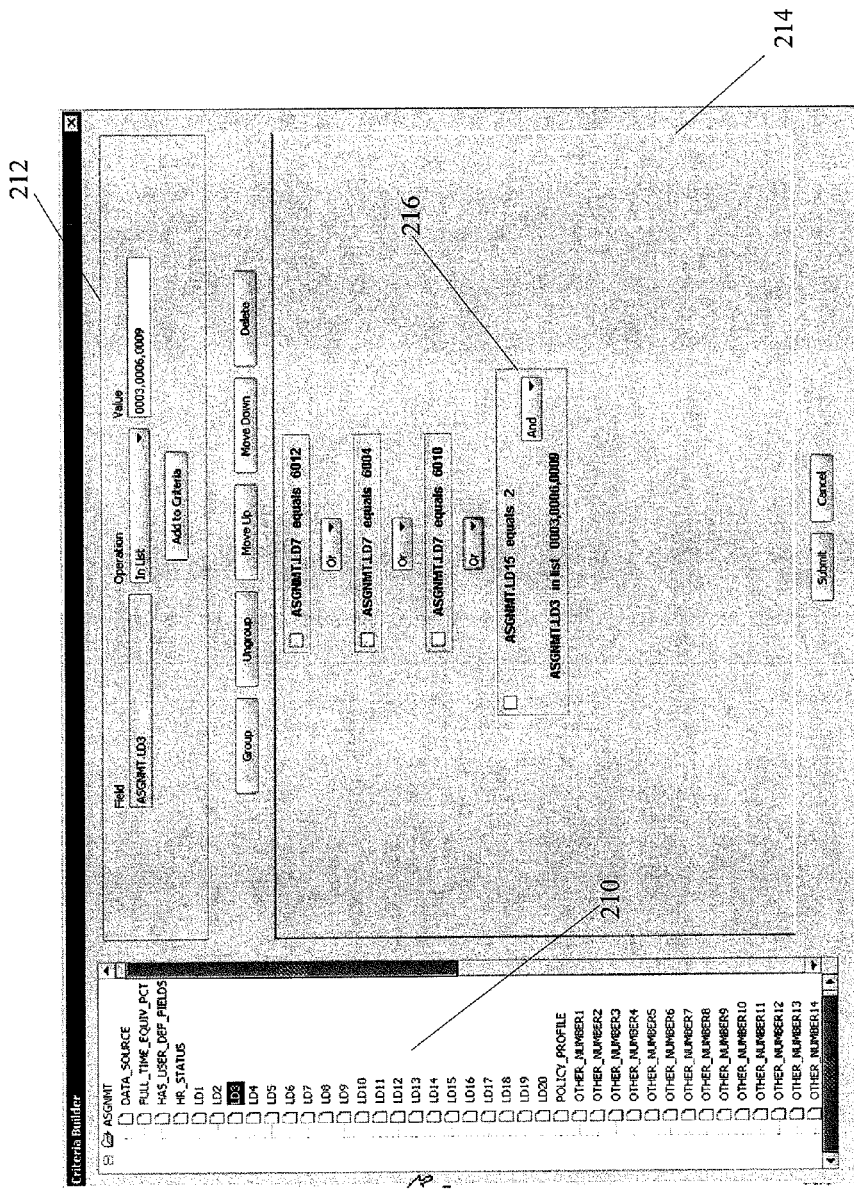
Figure 3:
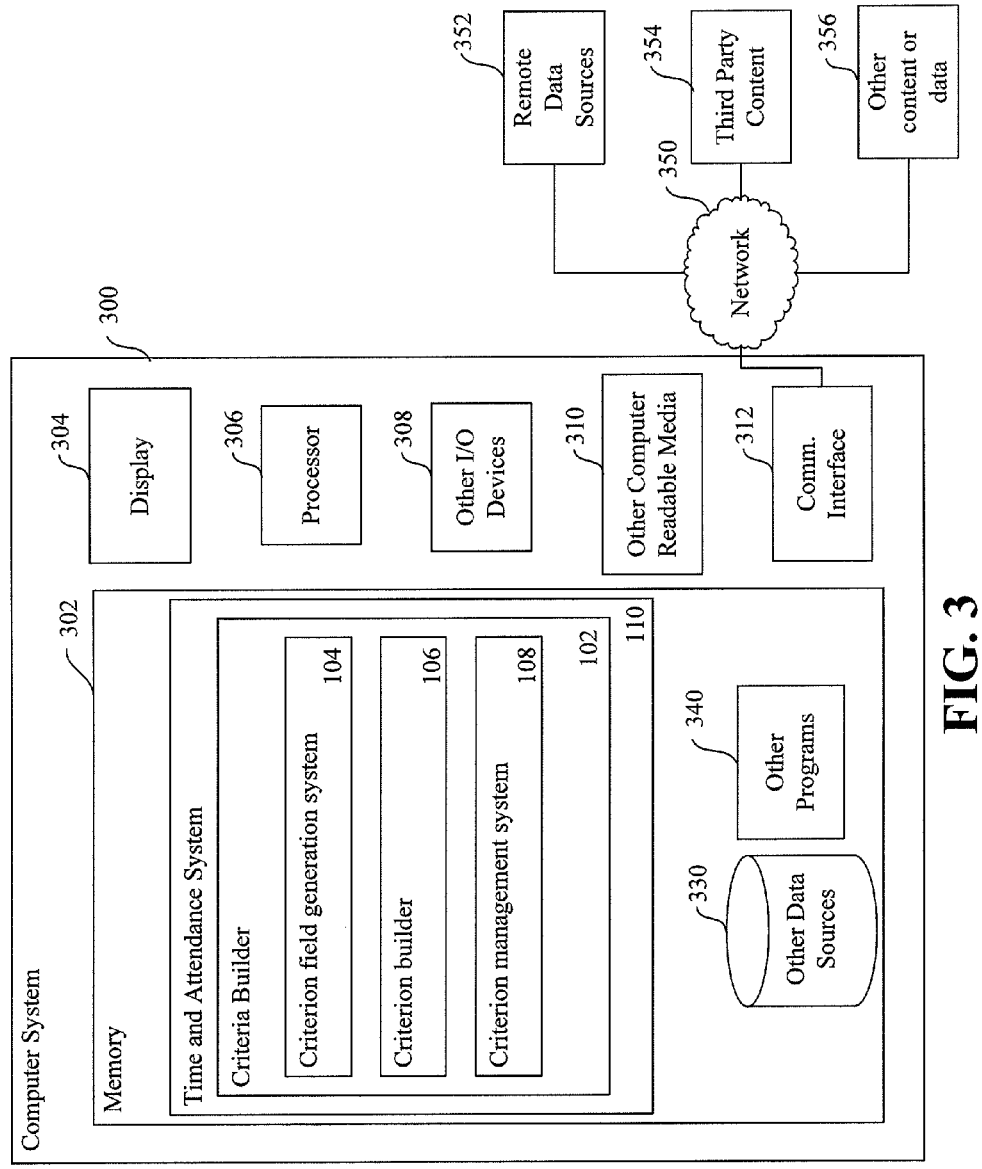
Figure 4:
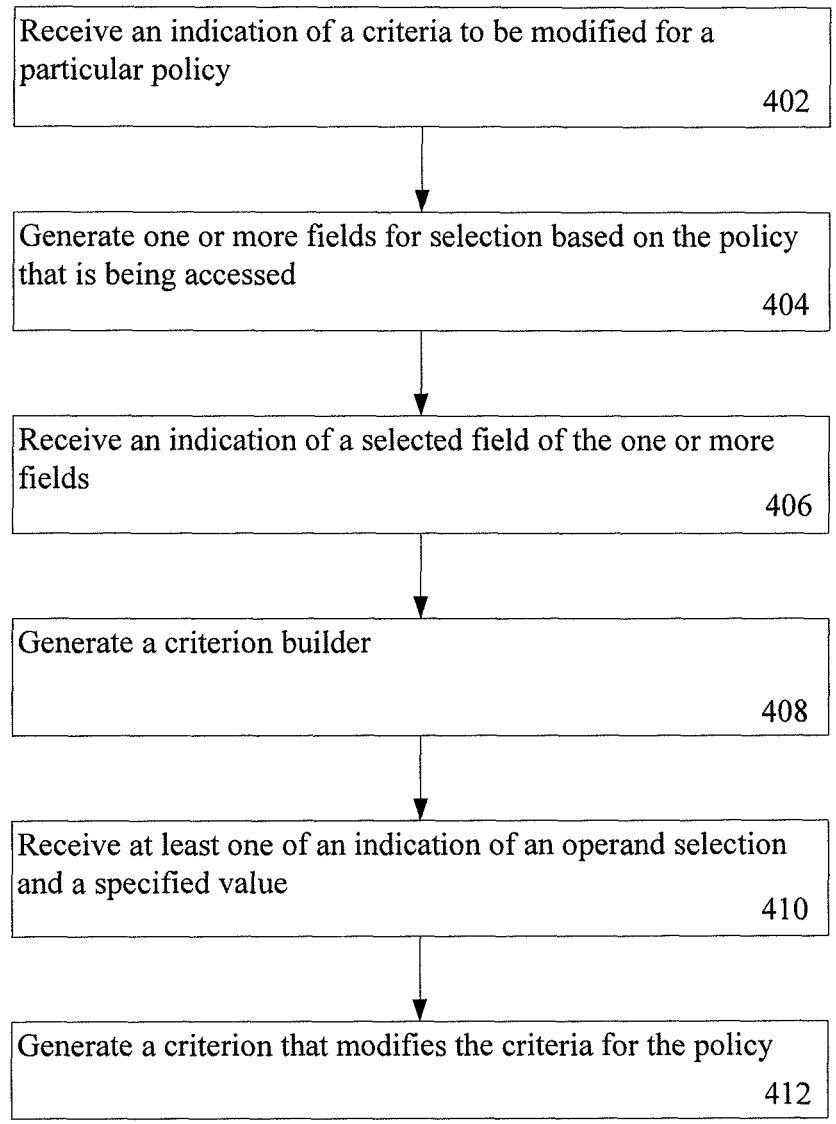
Figure 5:
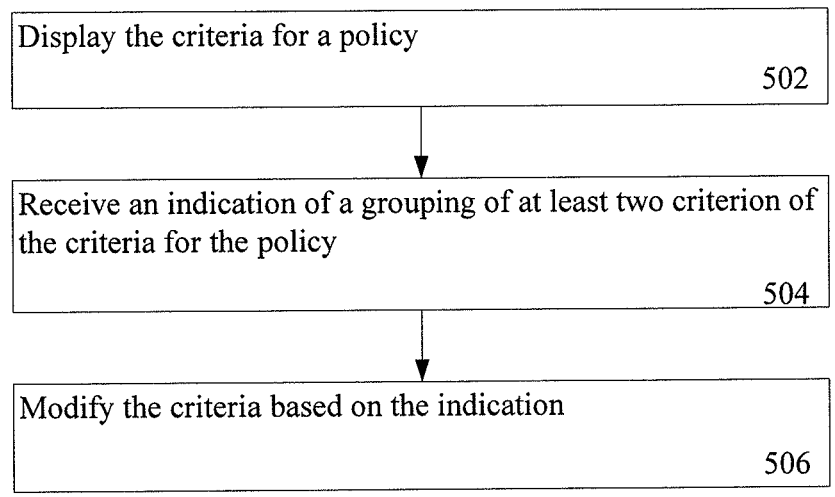
Figure 6:
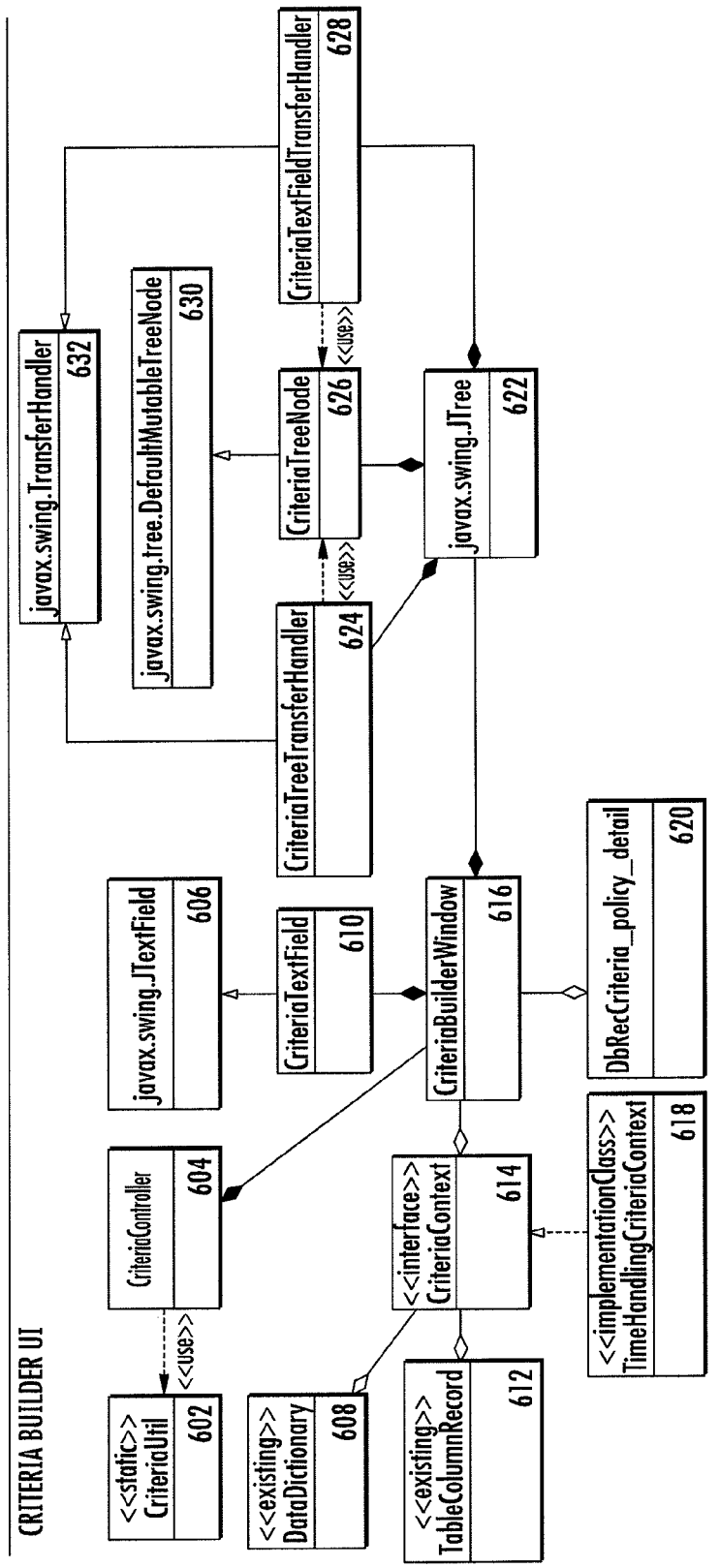
Figure 7:
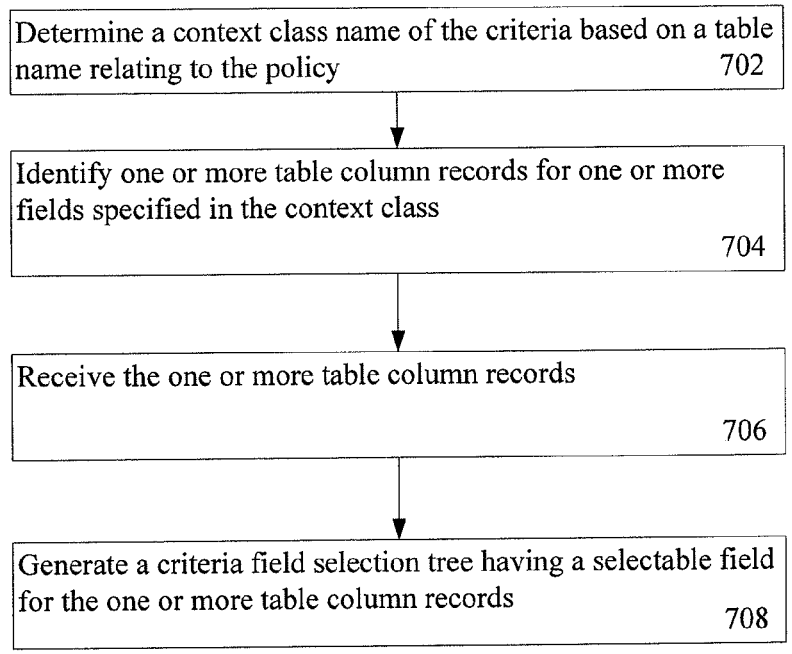
Figure 8:
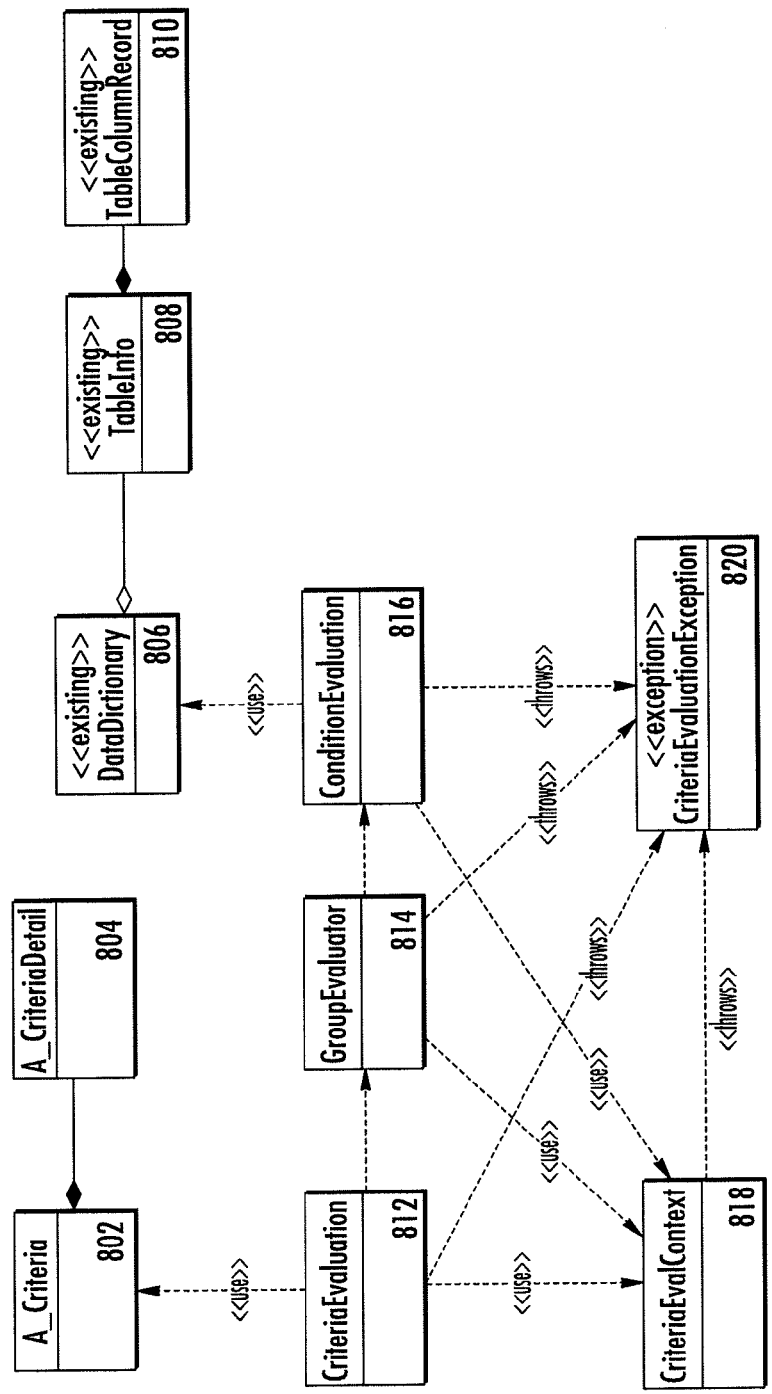
Figure 9:
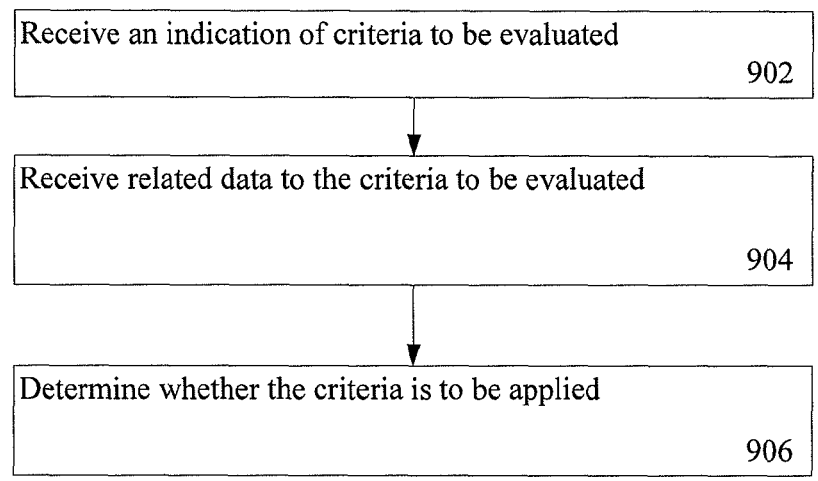
Figure 10:
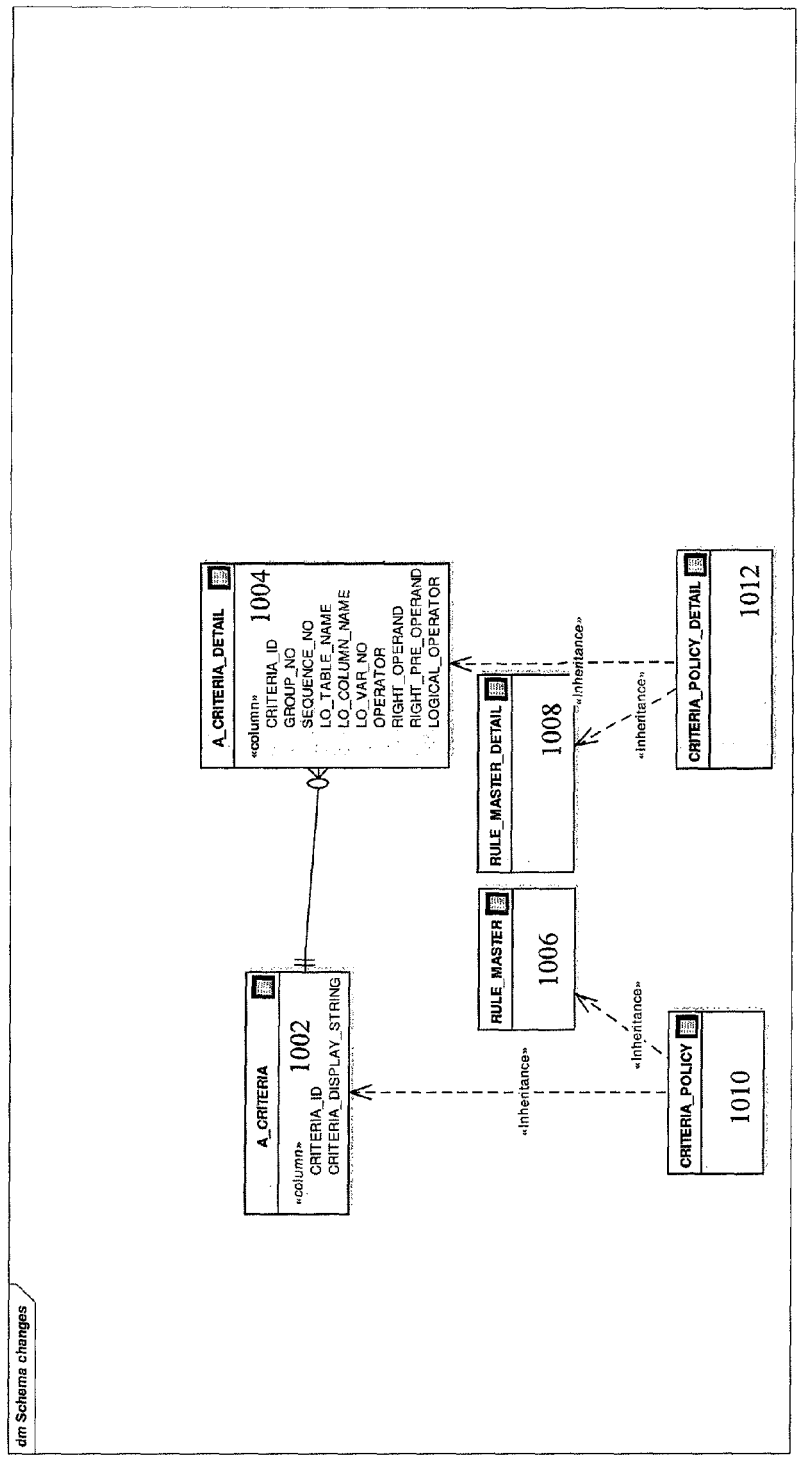

Having thus described embodiments of the invention in general terms, reference will now be made to the accompanying drawings, which are not necessarily drawn to scale, and wherein:

FIG. 1 is a schematic representation of a policy management environment that may benefit from some example embodiments of the present invention;

FIGS. 2a and 2b illustrate screenshots of an example policy management environment according to some example embodiments of the present invention;

FIG. 3 illustrates a block diagram of an apparatus that embodies a policy manager in accordance with some example embodiments of the present invention;

FIGS. 4, 5, 7 and 9 illustrate flowcharts that may be performed by an apparatus that embodies a policy manger in accordance with some example embodiments of the present invention; and FIGS. 6 and 8 illustrate a class diagram representative of a class structure of an example policy manger in accordance with some example embodiments of the present invention; and FIG. 10 illustrates an example schema diagram representative of the structure of database tables in accordance with some example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, software programs may be built such that they include various policies that, based on established criteria, may result in particular action or consequence occurring. For example, a software program, such as a time and attendance program, may include criteria that may define an instance in which a pay rule set is applied to a particular timesheet. As such, methods, apparatuses, and computer program products are described herein that are configured to enable a user to quickly and easily generate criteria (e.g., a formula) that indicate instances in which a policy is to be activated or otherwise applied by a software program. In some example embodiments, a policy may comprise one or more rules that are to be applied when a criteria is satisfied. For example, a policy of applying an overtime pay rate to worked hours may be applied in an instance in which an employee's hours are over 40 hours and if they are a full time employee.

In further examples, the criteria may be used to invoke a policy that causes a particular scheduling entry to be transitioned to a time card. For example, in an instance in which holiday time or education time is on a schedule, that particular block of time may be transferred directly to a timecard in an instance in which that particular employee meets the criteria defined in the policy.

The methods, apparatuses, and computer program products described herein are therefore configured to enable a user, who is not necessarily a computer programmer, to generate a criteria based on a series of defined criterion in order to modify a corresponding computer program (e.g., a time and attendance system). In some examples and in an instance in which a selection of a policy to be accessed or otherwise modified is received, one or more fields may be automatically generated that may be used by a user in generating a criterion for the selected policy. For example, a class that is related to a particular policy defines one or more fields. The fields presented are those fields that are appropriate or otherwise useable in conjunction with the particular policy to be applied.

The one or more fields are selectable, such that once an indication is received that a field has been selected, the selected field may be displayed in conjunction with a list of operations (e.g., greater than, less than or the like). A user may then select a particular operation then may enter a specific value as the operand. For example, if a number of hours field was selected for an overtime policy, the operation selected may be greater than and the operand may be 40 hours, thus causing the policy to be activated if a particular employee had hours greater than 40 hours. In some cases a predefined set of values may also be presented. Once a field, an operation and an operand are received, the criterion may be verified and then stored.

In some examples, criterion may be grouped with the other criterion related to the same policy. For example, an overtime policy may include criteria that define each of the various instances overtime is applied. In a first case overtime may be applied when hours are greater than 40, but overtime may also be applied if the work day was a holiday. As such, a logical operator, such as "or" may then be applied to signify that the overtime policy is to be applied when hours are greater than 40 or if the day is a holiday. Using this input, the system may generate the criteria for the policy, such as the overtime policy, so that the overtime policy can be applied by a time and attendance system.

As such, a user may generate criteria for a policy using the intuitive user interface that is configured as described herein. Advantageously, the user interface displays those fields and related operations that the user may use to build a particular criterion. The use of the interface is operable, for example, to simplify the entire process of building the criteria for the policy. Once the criterion is defined in the user interface, the methods, apparatuses and computer program products are configured to generate the criteria in the appropriate programming language using the appropriate variables and the proper syntax so that the criteria can be implemented by the software program.

FIG. 1 is an example block diagram of example components of an example policy management environment 100. In some example embodiments, the policy management environment 100 comprises a criteria builder 102 and a system or software program having policies to be managed, such as a time and attendance system 110. However, the time and attendance system 110 is only provided as an example software program, in other example embodiments other software programs associated with policies to be activated/instantiated may be used. The criteria builder 102 may take the form of, for example, a code module, a component, circuitry and/or the like. The components of the policy management environment 100 are configured to provide various logic (e.g., code, instructions, functions, routines and/or the like) and/or services related to the generation and application of criteria that define an instance in which a policy should be activated or otherwise applied.

In some example embodiments, the criteria builder 102 may operate as a component of, be embodied by or otherwise have access to the time and attendance, or similar, system 110. As such, the criteria builder 102 is configured to receive an indication of a particular policy associated with the system 110 that has been selected and an indication of any current criterion that make up the criteria for that policy. In order to build or otherwise modify the current criteria, the criteria builder 102 comprises a criterion field generation system 104, a criterion builder 106 and a criterion management system 108.

In some example embodiments, the criterion field generation system 104 is configured to provide a user with one or more selectable fields related to the selected policy. In some example embodiments, and as discussed in more detail below with regard to FIG. 7, the criterion field generation system 104 is configured to automatically and dynamically generate the fields based on a criteria context interface class given the particular policy that was selected by the user. In some example embodiments, the one or more fields are used by the criterion field generation system 104 to instantiate the list of one or more fields that are selectable by the user. In some examples, the one or more fields may be displayed in a drop box, a combo box or via other means that renders or otherwise displays the one or more fields so that they are selectable by the user.

In some example embodiments, the criterion builder 106 may be configured to receive an indication of the selected field. The indication may be received via a double click of a field by a user, a drag and drop of the field and/or the like. In some examples, the criterion builder 106 may be configured to cause the selected field to be displayed along with an operation selection drop box (e.g., in list, equals, greater than, less than and/or the like) and an input area for a specified value. In some examples, the specified value may be pre-defined based on the selected field and/or a selected operation. Consequently, the criterion builder 106 is configured to receive the field, operation and specified value and based on the received field, operation and specified value generate a criterion for addition to the criteria for the policy.

In some example embodiments, the criterion that makes up the criteria for activating a policy can be managed by the criterion management system 108. In some example embodiments, the criterion management system 108 is configured to display the criterion that has been generated with respect to the criteria (e.g., a visual representation of each of the currently generated formulas). In some example embodiments, the criterion management system 108 may then enable users to group or otherwise define how the criterion will be used with respect to each other, such as via the use of logical operators or logical statements. In other example embodiments, the criterion management system 108 may further enable a user to group, ungroup, move up, move down, and/or delete a criterion.

Alternatively or additionally, and as discussed in more detail below with regard to FIG. 8, the criteria builder 102 may further be configured to evaluate the criterion that are entered. For example, and in some example embodiments, the criteria builder 102, such as via the criterion builder 106 is configured to determine whether the entered criterion is valid. In other example embodiments, the criteria builder 102, such as via the criterion management system 108 is also configured to verify or otherwise check criterion groupings and the overall criteria for validity.

FIG. 2a illustrates a screenshot of a policy editor page according to example embodiments described herein. As is shown in the illustrated screenshot, one or more policies 202 may be presented for selection. These policies 202 may relate to pay codes, exceptions, holidays and/or the like associated with whatever system or software program for which the user is modifying policies (e.g., the time and attendance system 110). In some examples, and as shown with respect to FIG. 2a, a policy for exempt employees has been selected and a pay code set AOS-Exclude has been identified. The criteria 204 that defines an instance in which that particular paycode is to be applied is shown as empty in FIG. 2a. However, a user may activate a criteria builder by selecting the activation button 206 to generate a criteria for instances in which the policy is to be implemented.

FIG. 2b illustrates a screenshot of a criteria builder that may be activated according to some example embodiments described herein. As is shown in FIG. 2b, a list of fields are displayed in the field area 210. As described in more detail below, these fields are selected based on the accessed policy, such as the highlighted policy shown in FIG. 2a. The field selected, represented by the highlighted field LD3, is displayable in the criterion builder 212 or builder bar. The criterion builder 212 may also comprise an operation drop down box and an input box that is configured to allow input of a specified value, or selection of a predefined value. A completed criterion is a criterion that has at least a selected field, a selected operation and either a predefined value or a specified value. A completed criterion in the criterion builder 212 is configured to be added to the criterion grouping system 214. As is illustrated in FIG. 2b, the criterion grouping system 214 comprises multiple criterion that make up the policy criteria and may be joined with a logical operator and/or grouped, such as is shown with respect to criterion group 216. The criterion shown in the criterion grouping system 214 is representative of the criteria that is used to determine whether a policy is activated.

FIG. 3 is an example block diagram of an example computing device for practicing embodiments of an example criteria builder application. In particular, FIG. 3 shows a computing system 300 that may be utilized to implement a policy management environment 100 having a criteria builder 102 including, in some examples, a criterion field generation system 104, a criterion builder 106 and a criterion management system 108. One or more general purpose or special purpose computing systems/devices may be used to implement the criteria builder 102. In addition, the computing system 300 may comprise one or more distinct computing systems/devices and may span distributed locations. In some example embodiments, the criteria builder 102 may be configured to operate remotely via the network 350. In other example embodiments, a pre-processing module or other module that requires heavy computational load may be configured to perform that computational load and thus may be on a remote device or server. For example, the criterion field generation system 104 may be accessed remotely. In other example embodiments, the criteria builder 102 may be accessed locally, while the time and attendance system 110 may be accessed remotely. Furthermore, each block shown may represent one or more such blocks as appropriate to a specific example embodiment. In some cases one or more of the blocks may be combined with other blocks. Also, the criteria builder 102 may be implemented in software, hardware, firmware, or in some combination thereof to achieve the capabilities described herein.

In the example embodiment shown, computing system 300 comprises a computer memory ("memory") 302, a display 304, one or more processors 306, input/output devices 308 (e.g., keyboard, mouse, CRT or LCD display, touch screen, gesture sensing device and/or the like), other computer readable media 310, and communications interface 312. The processor 306 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 306 comprises a plurality of processors. The plurality of processors may be in operative communication with each other and may be collectively configured to perform one or more functionalities of the criteria builder application as described herein.

The criteria builder 102 is shown residing in memory 302. In some examples embodiments, the criteria builder 102 is shown as part of the time and attendance, or similar, system 110 also residing in the memory 302. The memory 302 may comprise, for example, transitory and/or non-transitory memory, such as volatile memory, non-volatile memory, or some combination thereof. Although illustrated in FIG. 3 as a single memory, the memory 302 may comprise a plurality of memories. The plurality of memories may be embodied on a single computing device or may be distributed across a plurality of computing devices collectively configured to function as the criteria builder application or system. In various example embodiments, the memory 302 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, and/or some or all of the components of the criteria builder 102 may be stored on and/or transmitted over the other computer-readable media 310. The components of the criteria builder 102 preferably execute on one or more processors 306 and are configured to enable operation of a criteria builder application, as described herein.

Alternatively or additionally, other code or other programs 340 (e.g., an administrative interface, one or more application programming interface, a Web server, and the like) and potentially other data repositories, such as other data sources 330, also reside in the memory 302, and preferably execute on one or more processors 306. Of note, one or more of the components in FIG. 3 may not be present in any specific implementation. For example, some embodiments may not provide other computer readable media 310 or a display 304.

The criteria builder 102 is further configured to provide functions such as those described with reference to FIG. 1. The criteria builder 102 may interact, via the network 350 and the communications interface 312, with remote data sources 352 (e.g., remote time keeping systems, time keeping data and/or the like), third-party content 354 and/or other content or data 356. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In this regard, the communications interface 312 may be capable of operating with one or more air interface standards, communication protocols, modulation types, access types, and/or the like.

In an example embodiment, components/modules of the criteria builder 102 are implemented using standard programming techniques. For example, the criteria builder 102 may be implemented as a "native" executable running on the processor 306, along with one or more static or dynamic libraries. In other embodiments, the criteria builder 102 may be implemented as instructions processed by a virtual machine that executes as one of the other programs 340. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the criteria builder 102, such as by using one or more application programming interfaces can be made available by mechanisms such as through application programming interfaces (API) (e.g., C, C++, C#, Objective C and Java); libraries for accessing files, databases, or other data repositories; through scripting languages such as XML; or through Web servers, FTP servers, or other types of servers providing access to stored data. The other data sources 330 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the criteria builder 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 4, 5, 7 and 9 illustrate example flowcharts of the operations performed by an apparatus, such as computing system 300 of FIG. 3 embodied by a mobile device or a workstation, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 302 of an apparatus employing an embodiment of the present invention and executed by a processor 306 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4, 5, 7 and 9, when executed, convert a computer or processing circuitry into a particular machine configured to perform an example embodiment of the present invention. Accordingly, the operations of FIGS. 4, 5, 7 and 9 define an algorithm for configuring a computer or processor, to perform an example embodiment. In some cases, a general purpose computer may be provided with an instance of the processor which performs the algorithm of FIGS. 4, 5, 7 and 9 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

FIG. 4 illustrates a flowchart that may be performed by an apparatus that embodies the criteria builder in accordance with some example embodiments of the present invention. As is shown in operation 402, an apparatus, such as the computing system 300, may include means, such as the criteria builder 102, the processor 306, or the like, for receiving an indication of criteria to be modified for a particular policy. In some examples the policy may take the form of a time handling policy that causes a time entry to be moved from a schedule to a time card. The policy may comprise criteria that are used to determine whether the policy is to be applied.

As is shown in operation 404, an apparatus, such as the computing system 300, may include means, such as the criteria builder 102, the criterion field generation system 104, the processor 306, or the like, for generating one or more fields for selection based on the policy that is being accessed. In some example embodiments the fields selected are the particular fields that are applicable to the policy. A more detailed discussion of how the fields may be generated is provided below with regard to FIG. 7.

As is shown in operation 406, an apparatus, such as the computing system 300, may include means, such as the criteria builder 102, the criterion builder 106, the processor 306, or the like, for receiving an indication of a selected field of the one or more fields. As is shown in operation 408, an apparatus, such as the computing system 300, may include means, such as the criteria builder 102, the criterion builder 106, the processor 306, or the like, for generating a criterion builder. In some example embodiments, the criterion builder comprises an indication of the selected field, a listing of operations that may be applied to a specific value or a predefined value and an input area for the entry of a specified value.

As is shown in operation 410, an apparatus, such as the computing system 300, may include means, such as the criteria builder 102, the criterion builder 106, the processor 306, or the like, for receiving an indication of an operation selection and a specified value. As is shown in operation 412, an apparatus, such as the computing system 300, may include means, such as the criteria builder 102, the criterion builder 106, the processor 306, or the like, for generating a criterion that modifies the criteria for the policy. In some example embodiments, the criterion is generated based on the indication of the selected field and the indication of an operation selection and the specified value.

In response to the modification of the criteria for the policy, the computing system 300, may include means, such as the criteria builder 102, the processor 306, or the like, for storing the criteria. In some examples, the criteria may be stored as illustrated by the schema diagram shown with reference to FIG. 10. In further example embodiments, the stored criteria may be loaded into the computing system 300, such as by the criteria builder 102, the processor 306, or the like, in an instance in which the criteria is to be evaluated. The evaluation of criteria is further described with reference to FIGS. 8 and 9.

FIG. 5 illustrates a flowchart that may be performed by an apparatus that embodies the criteria builder in accordance with some example embodiments of the present invention. As is shown in operation 502, an apparatus, such as the computing system 300, may include means, such as the criteria builder 102, the criterion management system 108, the processor 306, or the like, for displaying the criteria for a policy. As is shown in operation 504, an apparatus, such as the computing system 300, may include means, such as the criteria builder 102, the criterion management system 108, the processor 306, or the like, for receiving an indication of a grouping of at least two criterions of the criteria for the policy. In some example embodiments, grouping the at least two criterion comprises joining with at least two criterion with a logical operator. As is shown in operation 506, an apparatus, such as the computing system 300, may include means, such as the criteria builder 102, the criterion management system 108, the processor 306, or the like, for modifying the criteria based on the indication.

FIG. 6 illustrates a class diagram representative of an example criteria builder user interface in accordance with some example embodiments of the present invention. As shown, criteria context 614 (e.g., an interface that allows an implementing class to define selectable fields and predefined values that are to be available to an implementing policy) is related to data dictionary 608 (e.g., a data store that is configured to store meta information stored in one or more tables such as table_info, table_columns and choice_details), table column record 612 (e.g., represents schema information about a column in a database table such as data type, reference to the TableInfo that contains the TableColumnRecord, variable field count and/or the like), criteria builder window 616 (e.g., a graphical user interface that enables creation of criterion for the implementing policy) and time handling criteria context 618 (e.g., example criteria context interface implementation). For example, using a time handling rule policy as an example, its criteria context implementation class may be a time handling criteria context.

In some examples the criteria builder window 616 is associated with a criteria controller 604 (e.g., a class that is configured to enable interaction between a policy editor and a criteria builder) which is associated with a criteria utility 602 (e.g., a utility class that is configured to transform criterion into a data structure that is able to be transferred to and from the criteria builder), DbRec_Criteria_policy_detail 620 (e.g., represents database records in a criteria_policy_detail table) and a javax.swing.Jtree 622 (e.g., a Java Swing control that is configured to display hierarchical data as an outline). The javax.swing.Jtree 622 is associated with the criteria tree transfer handler 624 (e.g., configured to extend a TransferHandler class that enables the transfer of data during a drag-and-drop operation), the criteria tree node 626 (e.g., an extension of a DefaultMutableTreeNode class that is configured to hold selectable field information such as data type, field value, column name and table name) and the criteria text field transfer handler 628 (e.g., configured to extend a TransferHandler class that enables the transfer of data during a double-click operation). In some examples the transfer handler 624 and the criteria text field transfer handler 628 are also associated with the criteria tree node 626 and the javax.swing.TransferHandler 632 (e.g., a Java Swing class that is configured to be used to handle the transfer of a Transferable to and from Swing Component). In some examples the criteria tree node 626 is associated with the javax.swing.tree.DefaultMutableTreeNode 630 (e.g., a Java Swing general purpose node in an example tree data structure).

FIG. 7 illustrates a flowchart that may be performed by an apparatus that embodies the criteria builder in accordance with some example embodiments of the present invention in order to generate a criteria field selection tree having one or more fields that may be selectable by a user. In some example embodiments, a criteria builder, such as criteria builder 102, is available for a policy in an instance in a CriteriaContext class is implemented for that particular policy. By way of example, an instance in which a CriteriaContext class is implemented, a table name and column name pair may be specified by the CriteriaContext class for each selectable field that is to appear in a criteria field selection tree. In some examples, each CriteriaContext class is mapped to a particular policy, such as by using CriteriaContextMap class where the detail table name of the policy is the key, and the criteria context implementation is the value. Alternatively or additionally, predefined values may also be specified in the CriteriaContext class.

In some example embodiments, one or more fields relating to a policy are derived from a criteria context interface implementation, which, as shown above, also define the tables and pre-defined values to be used by the criteria builder for the policy. The policy is mapped to a criteria context based on the detail table name of the policy. As is shown in operation 702, an apparatus, such as the computing system 300, may include means, such as the criteria builder 102, the processor 306, or the like, for determining a criteria context implementation class name of the criteria context based on a table name relating to the policy (e.g., TIME_HANDLING_RULE_DETAIL>>Time Handling Rule Criteria Context) in an instance in which the policy has a related CriteriaContext implementation. In some example embodiments, the computing system 300, such as via the criteria builder 102, the processor 306, or the like may be configured to determine whether the policy has a related CriteriaContext implementation by performing a lookup against the CriteriaContextMap to find and initialize the corresponding CriteriaContext class implementation.

As is shown in operation 704, an apparatus, such as the computing system 300, may include means, such as the criteria builder 102, the processor 306, or the like, for identifying one or more table column records for one or more fields specified in the criteria context interface implementation class. In some examples, each table name and/or column pair specified in the CriteriaContext implementation may be processed individually. In some examples, the table name is used to retrieve the corresponding TableInfo record from a Data-Dictionary.

As is shown in operation 706, an apparatus, such as the computing system 300, may include means, such as the criteria builder 102, the processor 306, or the like, for receiving one or more table column records, such as from the TableInfo record in the data dictionary. In some examples, the TableColumnRecord is stored in the CriteriaContext instance in an ordered list, such as an alphabetically ordered list, holding the TableColumnRecords for each selectable field. The table column records may comprise data type, table name, column name, field variable number and/or the like.

As is shown in operation 708, an apparatus, such as the computing system 300, may include means, such as the criteria builder 102, the processor 306, or the like, for generating a criteria field selection tree having a selectable field for the one or more table column records. For example, the CriteriaContext class instance may be passed to a CriteriaWindow, such as the window shown with reference to claim 2b, in an instance in which the window is launched. In some cases and while initializing the CriteriaWindow, the list of TableColumnRecords may be retrieved by the computing system 300, such as via the criteria builder 102, the processor 306, or the like from the context. From this list, a CriteriaTreeNode for each TableColumnRecord is created and added to the Field Selection Tree (i.e., JTree). In some examples, the CriteriaTreeNode extends DefaultMutableTreeNode to enable one or more of the nodes to store additional information, such as but not limited to table name, column name, field value, and data type, that may be used to perform criteria validation once the selectable field is used in a condition.

FIG. 8 illustrates a class diagram representative of a class structure of an example policy manager in accordance with some example embodiments of the present invention. As shown, criteria 802 has a relationship with criteria detail 804 that is configured to define the various criteria (e.g., a representation of data that represents criteria). The criteria evaluator 812 is configured to evaluate the criteria 802 to determine if the policy should be applied or not. The criteria evaluator 812 is configured to split the criteria into groups 814 for evaluation by the group evaluator 814 to evaluate a grouped set of criterion, and the conditions within the criteria are evaluated using condition evaluator 816. The condition evaluator 816 is also associated with a data dictionary 806 (e.g., represents meta information stored in tables such as table_info, table_columns and choice_details and may provide table information and table column records), table info 808 (e.g., may contain meta information from table_info table such as a list of columns for the table TableColumnRecords) and table column record 810 (e.g., represents schema information about a column in a database table). Each of the classes 806-810 are, in some examples, already existing in the software program, such as the time and attendance system. The criteria evaluation context 818 (e.g., is configured to store context information that is usable to evaluate criteria such as assignment, pay period, timesheet and schedule) is a holder for context information to evaluate criteria.

FIG. 9 illustrates a flowchart that may be performed by an apparatus that embodies the criteria builder in accordance with some example embodiments of the present invention in order to evaluate criteria to determine whether a policy should be applied. In some examples, evaluation may occur in an instance in which a policy may be applied, such as during a time sheet calculation in a time and attendance system. As is shown in operation 902, an apparatus, such as the computing system 300, may include means, such as the criteria builder 102, the processor 306, or the like, for receiving an indication of criteria to be evaluated. Criteria that are received are the criteria that were provided and/or otherwise presented in the criteria builder (criteria field generation system 104) during criteria creation.

As is shown in operation 904, an apparatus, such as the computing system 300, may include means, such as the criteria builder 102, the processor 306, or the like, for receiving related data to the criteria to be evaluated. In some examples, a Criteria Evaluation context is configured to capture the data that is to be used to evaluate the Criteria. For example, in a time and attendance system such data may relate to an employee, time sheet, assignment data and/or the like.

As is shown in operation 906, an apparatus, such as the computing system 300, may include means, such as the criteria builder 102, the processor 306, or the like, for determining whether the criteria is to be applied. In some examples, the criteria evaluation system includes the following classes: CriteriaEvaluator, GroupEvaluator and ConditionEvaluator as is described with reference to FIG. 8. In some examples, the ConditionEvaluator is configured to evaluate an individual condition or criterion by substituting a field value, such as from the evaluation context, for the field selected in the criterion and then evaluating the resulting expression to come up with a true/false value (e.g., an evaluation outcome). For example, if the criterion is Employee.age>21, the ConditionEvaluator is configured to determine the value for Employee.Age (e.g., the age of the employee in the context) and then substitute the age (e.g., 30) to evaluate whether the expression 30>21 is true, which it is in this example. In some examples, the GroupEvaluator is responsible for evaluating a group of conditions or criterion by applying logical operators such as AND, OR on the condition evaluation results. CriteriaEvaluator applies logical operators (AND, OR) on group evaluation results to determine the final outcome of True or False, which indicates whether the computing system 300 is to apply the policy.

FIG. 10 illustrates a schema diagram representative of example schema changes in accordance with some example embodiments of the present invention. In some examples, criteria 1002 contains attributes criteria ID and criteria display string. Criteria 1002 is associated with criteria detail 1004 that comprises attributes criteria id, group number, sequence number, left operand table name, left operand column name, left operand variable number, operator, right operand, right predefined operand and logical operator. In some examples, the operator choices may consist of greater than, less than, greater than or equal to, less than or equal to, in list, not in the list and/or the like. The logical operators may comprise and, or, either . . . or, if . . . then, only if, neither . . . nor or the like. In some examples, criteria detail may be associated with criteria policy detail 1012 which is associated with rule master detail 1008. In further examples, criteria 1002 may be associated with criteria policy 1010 and rule master 1006.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  receiving an indication of a selected policy of one or more policies defined by a software program;
  generating, using a processor and in response to receiving the indication of a selected policy, a plurality of fields that are applicable to a criteria for the selected policy, wherein the criteria comprises one or more criterion that define instances in which the selected policy is to be activated by the software program; and
  enabling a user to build a criterion that modifies the criteria for the selected policy, wherein the criterion is generated based on an indication of at least one selected field of the plurality of fields and an indication of an operation selection and a specified value associated with each selected field, wherein the software program is configured to use the criteria to determine an instance in which the selected policy is to be applied;
  wherein generating a plurality of fields further comprises:

determining a class name of a criteria context implementation based on a table name relating to the selected policy; and identifying one or more table column records for one or more fields specified in the criteria context implementation, wherein the one or more table column records are usable for generating the plurality of fields.

2. A method according to claim 1, further comprising:
generating a criteria field selection tree having the plurality of fields for the one or more table column records.

3. A method according to claim 1, further comprising:
generating a criterion builder, wherein the criterion builder comprises the plurality of fields and at least one selectable operation; and
receiving the operation selection and the specified value.

4. A method according to claim 1, further comprising:
causing display of the plurality of fields;
receiving an indication of a selected field of the plurality of fields; and
receiving an indication of an operation selection and a specified value related to the selected field.

5. A method according to claim 1, further comprising:
displaying the criterion with one or more previously generated criterion;
receiving an indication of a grouping of at least two criterion from the criterion and the one or more previously generated criterion; and
modifying the criteria based on the indication.

6. A method according to claim 4, wherein grouping of the at least two criterion comprises joining at least two criterion with a logical operator.

7. A method according to claim 1, further comprising:
receiving an indication of criteria to be evaluated;
receiving data from the software program related to the criteria to be evaluated; and
determining whether the criteria is to be applied.

8. An apparatus comprising:
at least one processor; and
at least one memory including computer program code, the at least one memory and the computer program code configured to, with the at least one processor, cause the apparatus to at least:
receive an indication of a selected policy of one or more policies defined by a software program;
generate a plurality of fields that are applicable to a criteria for a selected policy in response to receiving the indication of the selected policy, wherein the criteria comprises one or more criterion that define instances in which the selected policy is to be activated by the software program;
enable a user to build a criterion that modifies the criteria for the selected policy, wherein the criterion is generated based on an indication of at least one selected field of the plurality of fields and an indication of an operation selection and a specified value associated with each selected field, wherein the software program is configured to use the criteria to determine an instance in which the selected policy is to be applied;
determine a class name of a criteria context implementation based on a table name relating to the selected policy; and
identify one or more table column records for one or more fields specified in the criteria context implementation, wherein the one or more table column records are usable for generating the plurality of fields.

9. An apparatus according to claim 7, wherein the at least one memory including the computer program code is further configured to, with the at least one processor, cause the apparatus to:
generate a criteria field selection tree having the plurality of fields for the one or more table column records.

10. An apparatus according to claim 7, wherein the at least one memory including the computer program code is further configured to, with the at least one processor, cause the apparatus to:
generate a criterion builder, wherein the criterion builder comprises the plurality of fields and at least one selectable operation; and
receive the operation selection and the specified value.

11. An apparatus according to claim 7, wherein the at least one memory including the computer program code is further configured to, with the at least one processor, cause the apparatus to:
cause display of the plurality of fields;
receive an indication of a selected field of the plurality of fields; and
receive an indication of an operation selection and a specified value related to the selected field.

12. An apparatus according to claim 7, wherein the at least one memory including the computer program code is further configured to, with the at least one processor, cause the apparatus to:
display the criterion with one or more previously generated criterion;
receive an indication of a grouping of at least two criterion from the criterion and the one or more previously generated criterion; and
modify the criteria based on the indication.

13. An apparatus according to claim 7, wherein grouping of the at least two criterion comprises joining at least two criterion with a logical operator.

14. An apparatus according to claim 7, wherein the at least one memory including the computer program code is further configured to, with the at least one processor, cause the apparatus to:
receive an indication of criteria to be evaluated;
receive data from the software program related to the criteria to be evaluated; and
determine whether the criteria is to be applied.

15. A computer program product comprising:
at least one computer readable non-transitory memory medium having program code instructions stored thereon, the program code instructions which when executed by an apparatus cause the apparatus at least to:
receive an indication of a selected policy of one or more policies defined by a software program;
generate a plurality of fields that are applicable to a criteria for a selected policy in response to receiving the indication of the selected policy, wherein the criteria comprises one or more criterion that define instances in which the selected policy is to be activated by the software program; and
enable a user to build a criterion that modifies the criteria for the selected policy, wherein the criterion is generated based on an indication of at least one selected field of the plurality of fields and an indication of an operation selection and a specified value associated with each selected field, wherein the software program is configured to use the criteria to determine an instance in which the selected policy is to be applied;
wherein generating a plurality of fields further comprises:

determining a class name of a criteria context implementation based on a table name relating to the selected policy; and identifying one or more table column records for one or more fields specified in the criteria context implementation, wherein the one or more table column records are usable for generating the plurality of fields.

16. A computer program product according to claim 14, wherein the program code instructions are further configured to, when executed by the apparatus, cause the apparatus at least to:

generate a criterion builder, wherein the criterion builder comprises the plurality of fields and at least one selectable operation; and receive the operation selection and the specified value.

17. A computer program product according to claim 14, wherein the program code instructions are further configured to, when executed by the apparatus, cause the apparatus at least to:

display the criterion with one or more previously generated criterion;

receive an indication of a grouping of at least two criterion from the criterion and the one or more previously generated criterion; and modify the criteria based on the indication.

18. A computer program product according to claim 14, wherein the program code instructions are further configured to, when executed by the apparatus, cause the apparatus at least to:

receive an indication of criteria to be evaluated;

receive data from the software program related to the criteria to be evaluated; and determine whether the criteria is to be applied.

* * * * *

UNITED STATES PATENT AND TRADEMARK OFFICE
CERTIFICATE OF CORRECTION

Page 1 of 1

PATENT NO. : 8,782,736 B1
APPLICATION NO. : 13/755659
DATED : July 15, 2014
INVENTOR(S) : Thuppanna et al.

It is certified that error appears in the above-identified patent and that said Letters Patent is hereby corrected as shown below:

In the claims:

Column 15,
Line 30, "claim 4" should read --claim 5--.

Column 16,
Lines 1, 7, 15, 24, 34 and 37, "claim 7", each occurrence, should read --claim 8--.

Column 17,
Lines 8 and 16, "claim 14", each occurrence, should read --claim 15--.

Column 18,
Line 8, "claim 14" should read --claim 15--.

Signed and Sealed this
Twenty-fifth Day of November, 2014

Michelle K. Lee
*Deputy Director of the United States Patent and Trademark Office*